United States Patent
Sun et al.

(10) Patent No.: US 12,483,066 B1
(45) Date of Patent: Nov. 25, 2025

(54) ULTRA LOW POWER OBJECT DETECTION

(71) Applicant: Apple Inc., Cupertino, CA (US)

(72) Inventors: Bingyao Sun, San Jose, CA (US); Stephen C Terry, San Jose, CA (US); Ye Li, Sunnyvale, CA (US); Zaid A AbuKhalaf, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/246,177

(22) Filed: Jun. 23, 2025

Related U.S. Application Data

(60) Provisional application No. 63/802,728, filed on May 9, 2025, provisional application No. 63/802,717, filed on May 9, 2025, provisional application No. 63/802,722, filed on May 9, 2025, provisional application No. 63/680,816, filed on Aug. 8, 2024.

(51) Int. Cl.
  *H02J 50/10* (2016.01)
  *G01V 3/10* (2006.01)
  *H02J 50/60* (2016.01)

(52) U.S. Cl.
  CPC ............... *H02J 50/10* (2016.02); *G01V 3/10* (2013.01); *H02J 50/60* (2016.02)

(58) Field of Classification Search
  CPC ............ H02J 50/10; H02J 50/60; G01V 3/10
  USPC ....................................................... 307/104
  See application file for complete search history.

(56) References Cited

U.S. PATENT DOCUMENTS

| | | | |
|---|---|---|---|
| 8,810,194 B2 | 8/2014 | Kirby et al. | |
| 9,537,353 B1 | 1/2017 | Bossetti et al. | |
| 10,505,401 B2 | 12/2019 | Yang et al. | |
| 10,574,300 B2 | 2/2020 | Jung et al. | |
| 10,771,114 B2 | 9/2020 | Louis | |
| 11,038,382 B2 * | 6/2021 | Park | H02J 50/12 |
| 11,056,925 B2 * | 7/2021 | Kondo | G01V 3/10 |

(Continued)

FOREIGN PATENT DOCUMENTS

| KR | 20140090045 A | 7/2014 |
|---|---|---|
| KR | 101811292 B1 | 12/2017 |

(Continued)

OTHER PUBLICATIONS

Siltala, Juuso; "Power Supply Configuration Using NFC"; LUT University Master's Thesis (2023); retrieved from https:///urn.fi/URN:NBN:fi-fe2023062057310; 62 pgs.

*Primary Examiner* — Alfonso Perez Borroto
(74) *Attorney, Agent, or Firm* — FLETCHER YODER PC

(57) ABSTRACT

Detecting an object proximate an electronic device operable in a wireless power receiver (PRx) mode to receive power from a wireless power transmitter (PTx) or in a PTx mode to transmit power to an accessory can include using the wireless power transfer (WPT) coil to transmit a plurality of low power object detection (LPOD) pulses and detect a response thereto associated with the object, wherein the LPOD pulses can be generated without using a rectifier or an inverter of a WPT system associated with the device; responsive to detecting the object, identifying the object as a PRx or a PTx; responsive to identifying the object as a PRx, activating the PTx mode and transmitting power to the accessory using WPT circuitry of the electronic device; and responsive to identifying the object as a PTx, activating the PRx mode and receiving power from the PTx using the WPT circuitry.

22 Claims, 11 Drawing Sheets

(56) References Cited

U.S. PATENT DOCUMENTS

| | | |
|---|---|---|
| 11,159,054 B2 | 10/2021 | Pinciuc et al. |
| 11,422,281 B2 * | 8/2022 | Nakao .................. G01V 3/10 |
| 11,571,976 B2 * | 2/2023 | Widmer ................ H02J 50/10 |
| 11,641,134 B2 * | 5/2023 | Mohan .................. H02J 50/90 |
| | | 320/108 |
| 11,791,664 B2 * | 10/2023 | Yang ..................... G01V 3/10 |
| | | 324/239 |
| 11,982,403 B2 * | 5/2024 | Hakins .................. F16P 3/147 |
| 11,996,707 B2 | 5/2024 | Shi et al. |
| 2011/0070828 A1 | 3/2011 | Griffin et al. |
| 2023/0246488 A1 * | 8/2023 | Widmer ................ H02J 50/60 |
| | | 307/104 |

FOREIGN PATENT DOCUMENTS

| | | |
|---|---|---|
| KR | 102166687 B1 | 10/2020 |
| KR | 20230085808 A | 6/2023 |

\* cited by examiner

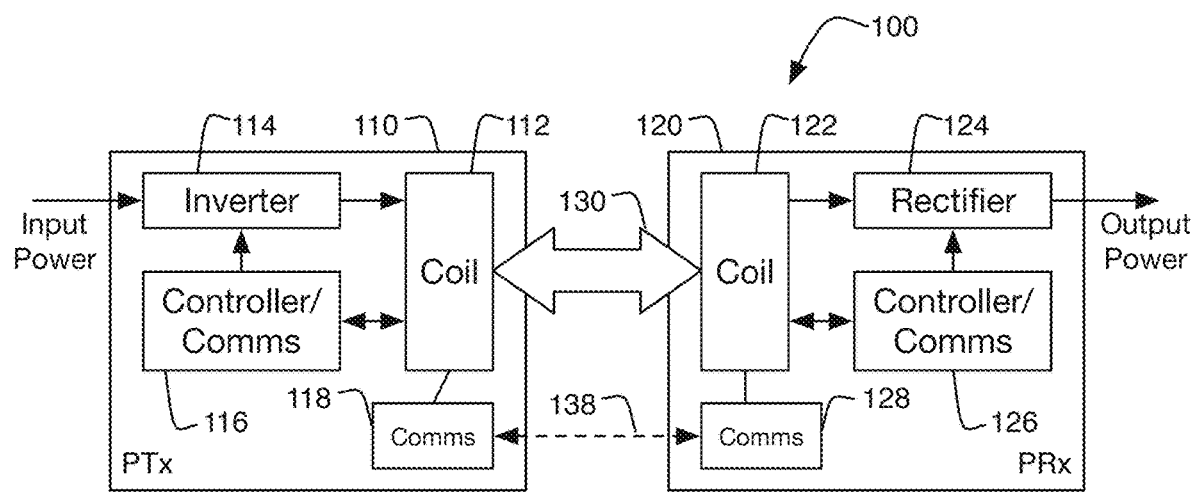
FIG. 1
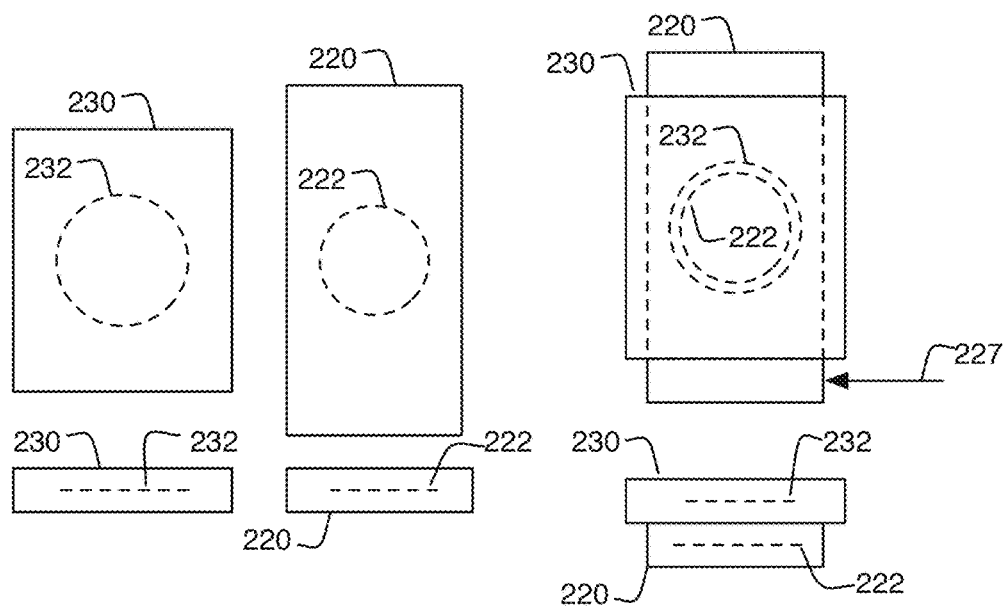
FIG. 2A  FIG. 2B

ULTRA LOW POWER OBJECT DETECTION

CROSS-REFERENCE TO RELATED APPLICATIONS

This application claims priority to U.S. Provisional Application No. 63/680,816 filed Aug. 8, 2024 and entitled "Detection and Coil Operation in Wireless Power Transfer", U.S. Provisional Application No. 63/802,717 filed on May 9, 2025 and entitled "Low Power Ping Transition to Wireless Power Receiver Mode", U.S. Provisional No. 63/802,722 filed on May 9, 2025 and entitled "Frequency Sweep to detect Attached Wireless Power Transmitter or Receiver", and U.S. Provisional No. 63/802,728 filed on May 9, 2025 and entitled "Ultra Low Power Object Detection"; all of which are incorporated by reference herein in their entirety.

BACKGROUND

Wireless power transfer is used in various electronic devices. For example, smart phones, tablet computers, smart watches, wireless earphones, styluses, etc. may employ wireless power transfer to facilitate charging of batteries within the devices and/or to power the devices during operation.

SUMMARY

A wireless power transmitting may use one or more techniques to detect whether a wireless power receiver is inductive coupled and ready for wireless power transfer operations.

An electronic device selectively operable in a wireless power receiver mode to receive power from a wireless power transmitter and in a wireless power transmitter mode to transmit power to an accessory can include a wireless power transfer coil; a rectifier coupled to the wireless power transfer coil and operable in the wireless power receiver mode to convert an AC voltage induced in the wireless power transfer coil by a wireless power transmitter to a DC voltage for use by the electronic device; an inverter coupled to the wireless power transfer coil and operable in the wireless power transmitter mode to convert a DC voltage to an AC voltage applied to the wireless power transfer coil; and controller and communication circuitry that: detects an object in proximity to the electronic device by using the wireless power transfer coil to transmit a plurality of low power object detection pulses and detect a response to the low power object detection pulses associated with the object, wherein the low power object detection pulses are generated by the controller and communication circuitry without using the rectifier or the inverter; responsive to detecting the object, identifies the object as one of at least a wireless power receiver and a wireless power transmitter; responsive to identifying the object as a wireless power receiver, activates the wireless power transmitter mode; and responsive to identifying the object as a wireless power transmitter, activates the wireless power receiver mode.

The response to the low power object detection pulses associated with the object can be a change in one or more electrical or magnetic parameters of a circuit including the wireless power transfer coil. The low power object detection pulses can be generated by low power object detection pulse injection circuitry separate from the inverter and coupled to the wireless power transfer coil. The low power object detection pulse injection circuitry can include detection circuitry responsive to a change in one or more electrical or magnetic parameters of a circuit including the wireless power transfer coil. The low power object detection pulses can be supplied at a frequency of 10 Hz. The low power object detection pulses can have a magnitude of 1.2V. The low power object detection pulses can be initially supplied at a first interval and, upon initial detection of the object, further low power object detection pulses can be supplied at a second interval shorter than the first interval.

The wireless power transfer coil can be a single coil. The rectifier and the inverter can be comprised of the same switching devices. At least one of activating the wireless power transmitter mode and activating the wireless power receiver mode can include loading additional firmware corresponding to one of the respective modes. Activating the wireless power transmitter mode can include sending one or more object detection pings with an interval between at least two of the one or more object detection pings being randomized.

A method, performed by wireless power transfer controller and communication circuitry of an electronic device operable in a wireless power receiver mode to receive power from a wireless power transmitter or in a wireless power transmitter mode to transmit power to an accessory, can include detecting an object in proximity to the electronic device by using the wireless power transfer coil to transmit a plurality of low power object detection pulses and detect a response to the low power object detection pulses associated with the object, wherein the low power object detection pulses are generated by the controller and communication circuitry without using a rectifier or an inverter of a wireless power transfer system associated with the electronic device; responsive to detecting the object, identifies the object as one of at least a wireless power receiver and a wireless power transmitter; responsive to identifying the object as a wireless power receiver, activating the wireless power transmitter mode and transmitting power to the accessory using wireless power transfer circuitry of the electronic device; and responsive to identifying the object as a wireless power transmitter, activating the wireless power receiver mode and receiving power from the wireless power transmitter using the wireless power transfer circuitry of the electronic device.

The response to the low power object detection pulses associated with the object can be a change in one or more electrical or magnetic parameters of a circuit including a wireless power transfer coil of the wireless power transfer circuitry. The low power object detection pulses can be generated by low power object detection pulse injection circuitry separate from an inverter of the wireless power transfer circuitry and coupled to a wireless power transfer coil of the wireless power transfer circuitry. The low power object detection pulse injection circuitry can include detection circuitry responsive to a change in one or more electrical or magnetic parameters of a circuit including a wireless power transfer coil of the wireless power transfer circuitry. The low power object detection pulses can be supplied at a frequency of 10 Hz. The low power object detection pulses can have a magnitude of 1.2V. The low power object detection pulses can be initially supplied at a first interval and, upon initial detection of the object, further low power object detection pulses can be supplied at a second interval shorter than the first interval.

At least one of activating the wireless power transmitter mode and activating the wireless power receiver mode can include loading additional firmware corresponding to one of the respective modes. Activating the wireless power transmitter mode can include sending one or more object detection pings with an interval between at least two of the one or more object detection pings being randomized.

Controller and communication circuitry for a wireless power transfer system of an electronic device, wherein the electronic device is selectively operable in a wireless power receiver mode to receive power from a wireless power transmitter and in a wireless power transmitter mode to transmit power to an accessory, can be configured to: detect an object in proximity to the electronic device by using the wireless power transfer coil to transmit a plurality of low power object detection pulses and detect a response to the low power object detection pulses associated with the object, wherein the low power object detection pulses are generated by the controller and communication circuitry without using a rectifier or an inverter of a wireless power transfer system associated with the electronic device; responsive to detecting the object, identify the object as one of at least a wireless power receiver and a wireless power transmitter; responsive to identifying the object as a wireless power receiver, activates the wireless power transmitter mode; and responsive to identifying the object as a wireless power transmitter, activates the wireless power receiver mode.

The controller and communication circuitry can be further configured to: activate the wireless power transmitter mode by loading additional firmware corresponding to the wireless power transmitter mode; and activate the wireless power receiver mode by loading additional firmware corresponding to the wireless power receiver mode.

BRIEF DESCRIPTION OF THE DRAWINGS

FIG. 1 illustrates a simplified block diagram of a wireless power transfer system.

FIGS. 2A-2B illustrate an electronic device capable of transmitting power wirelessly and an wireless power receiver capable of receiving power wirelessly.

DETAILED DESCRIPTION

Figure 3:
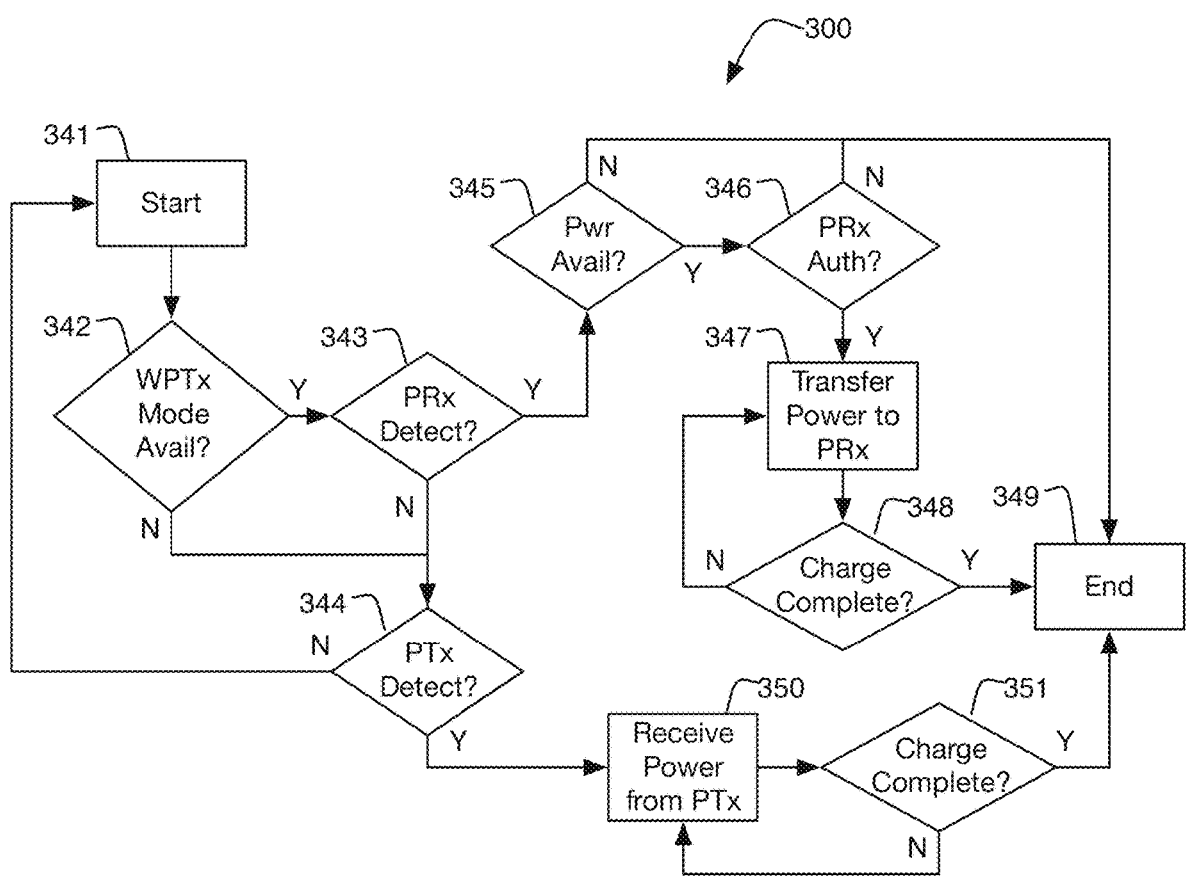
FIG. 3 illustrates a flowchart of an operating technique for an electronic device capable of transmitting power wirelessly and a wireless power receiver capable of receiving power wirelessly.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose. Any trademarks referenced herein are intended to only to identify examples and are property of their respective owners.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry. PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

FIGS. 2A-2B illustrate an electronic device 220 (also described herein as device 220) capable of receiving or transmitting power wirelessly and a wireless power receiver (PRx) 230 capable of receiving (and optionally also transmitting) power wirelessly. In some embodiments, device 220 can be a smartphone, although it could be other types of electronic device, such as a tablet computer, a notebook computer, etc. PRx 230 be a smartphone, although it could be other types of electronic device, such as a tablet computer, a notebook computer, etc. PRx 230 also includes accessory devices for use with device 220 or with other electronic devices. In some embodiments, PRx 230 can be an accessory to electronic device 220, such as a smartwatch, a wireless earphone charging case, a stylus, etc. that are paired in some way with the electronic device. (Such pairing could, but need not, be using Bluetooth® or other protocol.) To facilitate wireless power transfer, PRx 230 can include wireless power receiver circuitry such as that described above with respect to FIG. 1. For sake of brevity, only wireless power receiving coil 232 is depicted in FIGS. 2A-2B. Similarly, device 220 can include wireless power receiver circuitry as described above as well as wireless power transmitter circuitry. In some cases, the wireless power receiver circuitry and wireless power transmitter circuitry of device 220 can share one or more components. For example, a single wireless power transfer coil 222 can be used as both a wireless power receiving coil when device 220 is operating as a wireless power receiver to receive power from a wireless power transmitter (not shown) and as a wireless power transmitting coil when operating as a wireless power transmitter as described in greater detail herein. Other components of device 220's wireless power transfer circuitry may also be used in both wireless power receiver and wireless power transmitter mode. For example, common control and communication circuitry may be used in both operating modes, and common switching devices may be used as the inverter when in wireless power transmitter mode and as the rectifier when in the wireless power receiver mode.

FIG. 2A illustrates electronic device 220 and PRx 230 separated from one another in both a plan and sectional view. FIG. 2B illustrates electronic device 220 and PRx 230 overlapping as they would be positioned to facilitate wireless power transfer from device 220 to PRx 230. As illustrated, this overlapping allows for alignment of the respective wireless power transfer coils to facilitate wireless power transfer. Finally, also depicted in FIG. 2B, an external power source 227 may also be connected to electronic device 220. When such an external power source is connected, power from the external power source 227 can be delivered to PRx 230 by electronic device 220 operating in a wireless power transmitter mode. Finally, although the description herein refers to electronic device as being capable of operation as a wireless power transmitter or wireless power receiver and PRx 230 being capable of operation as a receiver, the reverse is also possible. For example, PRx 230 could be capable of wireless power receiver or wireless power transmitter operation, with electronic device 230 being capable of either bidirectional wireless power transfer or being a receiver only. The principles described herein are thus equally applicable to any type of electronic device or PRx and should not be limited to any particular examples given herein.

FIG. 3 illustrates a flowchart 300 of an operating technique for an electronic device capable of receiving or transmitting power wirelessly and a PRx capable of receiving power wirelessly. The process can be performed by any suitable control circuitry and/or processor(s) of the electronic device. This can include, but need not be limited to, the controller and communication circuitry of the wireless power transfer system of such a device, as was described above. For purposes of the following description, various actions or determinations will be described as being performed by the device, with the understanding that it is the appropriate control circuitry and/or processor(s) of the device (e.g., electronic device 220) that are being used to perform such actions or determinations. Additionally, while the various actions and determinations are being described in a particular order, in some cases, various actions or determinations could be performed in a different order, simultaneously, or potentially even omitted. Thus, the following description should not be construed as implying any particular order unless such order is expressly or implicitly required by nature of the specific actions or determinations.

The process can begin at Start block 341. Then, in block 342, the device can determine whether "wireless power transmit (WPTx) mode" is available. As used herein, "wireless power transmit mode" can be considered synonymous with a wireless power transmitter mode of operation in which the device operates as a wireless power transmitter to deliver power to a PRx device. Such power may be, but need not be, used by the PRx device for charging its own battery. In any case, various conditions or signals can be used to indicate that wireless power transmit mode is available in block 342. For example, the device being plugged into an external power source (as described above with respect to FIG. 2B) can be one such indication. If external power is available, then the device will have sufficient power so deliver power to the PRx, as well as not needing to receive power wirelessly for its own purposes. Additionally or alternatively, the device's battery charge state may be used to indicate whether wireless power transmit mode is available. That is, if the device's battery charge is above some threshold, it may be able to deliver power to an PRx device. Conversely, if the device's battery charge is below some threshold (which can be the same threshold or a different threshold), then the device may not have sufficient power reserves to deliver power to an PRx device. Additionally or alternatively, express user action can be used alone or in conjunction with other conditions or signals to indicate availability of the wireless power transmit mode. Orientation of the device could be one such user action. For example, a smart phone placed in a face-down orientation can allow the user to place a PRx device on the back of the smart phone allowing coupling of the respective wireless power transfer coils. Other orientations may be appropriate for different device types. In some applications, a physical switch or user interface affordance could be provided to allow a user to indicate that the wireless power transmit mode should be used. Each of the foregoing signals as well as others can be used separately or in various combinations to indicate that the wireless power transmit mode is available.

In block 342, if it is determined that wireless power transmit mode is not available, then, in block 344, it can be determined whether a wireless power transmitter device (PTx) is detected. If not, the process can return to Start block 341. Otherwise, if a wireless power transmitter is detected, in block 350 the electronic device 220 can receive power from the wireless power transmitter device. In block 351, it can be determined whether charging of the electronic device 220's internal battery is complete. If not, then receiving wireless power from the wireless power transmitter can continue. If so, then the process can end (block 349) and can optionally also return to the Start block 341). Additionally or alternatively, receiving wireless power from the wireless power transmitter in block 350 need not be limited to charging an internal battery of the device. For example, the received wireless power can also be used to power the electronic device 220, and, in such cases, it may be desirable to have the receiving of wireless power from the wireless power transmitter continue indefinitely as long as electronic device 220 is consuming power.

Returning to block 341, if it is determined that wireless power transmit mode is available, then, in block 343, the device can determine whether a PRx is detected. Such PRx is one that is capable of receiving wireless power from the device operating in a wireless power transmitter mode, although such PRx may also be capable of operating as a wireless power transmitter itself, as described above. If no PRx is detected in block 343, then it can be determined whether a wireless power transmitter is present in block 344 as described above. Otherwise, if a wireless power receiving PRx is detected in block 343, then it can be determined whether sufficient power is available to deliver power to the PRx device in block 345. This can be determined by whether an external power device is connected, the state of charge of the device's own battery, etc. Such determinations may be made as described above with respect to block 342 and can be either performed again if they were used to indicate availability of the wireless power transmit mode, performed independently, or omitted at this stage entirely in favor of a similar determination made in conjunction with block 342. In the illustrated example, if sufficient power is not available, the technique can end (block 349), and optionally return to Start block 341. Otherwise, the technique can proceed to PRx authentication in block 346.

In block 345, PRx authentication can be performed to verify that the device is suitable for receiving power wirelessly from the device operating in a wireless power transfer mode. Various authentication schemes and communication modes can be used depending on the requirements of a particular system. In some applications, the authentication could be omitted. In any case, the authentication can rely on an exchange of data, i.e., communication between the PRx and the device, with these communications being used by the device to identify the PRx and confirm that it is appropriate to power the device wirelessly, optionally even determining appropriate wireless power transfer parameters (e.g., power levels, operating frequencies, etc.) based on the authentication. The communication between the PRx device can be in band communication achieved by modulation of one or more properties of the wireless power transfer link (e.g., voltage or current amplitude, frequency, etc.) or out of band communication using an alternative communication channel, such as Bluetooth®, WiFI®, NFC (near field communication), etc. In some cases, the device may use its own resources to authenticate the PRx. In other cases, the device may communicate via network with a second device to perform or assist with the authentication. In any case, if the PRx is not authenticated, then the process can end (block 349), optionally returning to Start block 341. Otherwise, if the PRx device is authenticated, then wireless power transfer to the PRx can begin (block 347).

In block 347 the device can transfer power to the PRx/accessory. In block 348, it can be determined whether charging of the PRx's internal battery is complete. If not, then wireless power transfer can continue. If so, then the process can end (block 349) and can optionally also return to the Start block 341). Additionally or alternatively, wireless power transfer from device to PRx in block 347 need not be limited to charging an internal battery of the device. For example, the received wireless power can also be used to power the electronic device, and, in such cases, it may be desirable to have the receiving of wireless power from the wireless power transmitter continue indefinitely or to cease such wireless power transfer based on some other condition, such as availability of an external power connection or sufficient battery levels in the electronic device.

Initiation of the wireless power transmit mode described above with reference to FIG. 3 can be based on various triggering techniques. In some cases, such a mode can be triggered by inductive detection and at least some in band communication between the device and the PRx. Such arrangements are described in greater detail below with respect to FIGS. 4-7.

Figure 4:
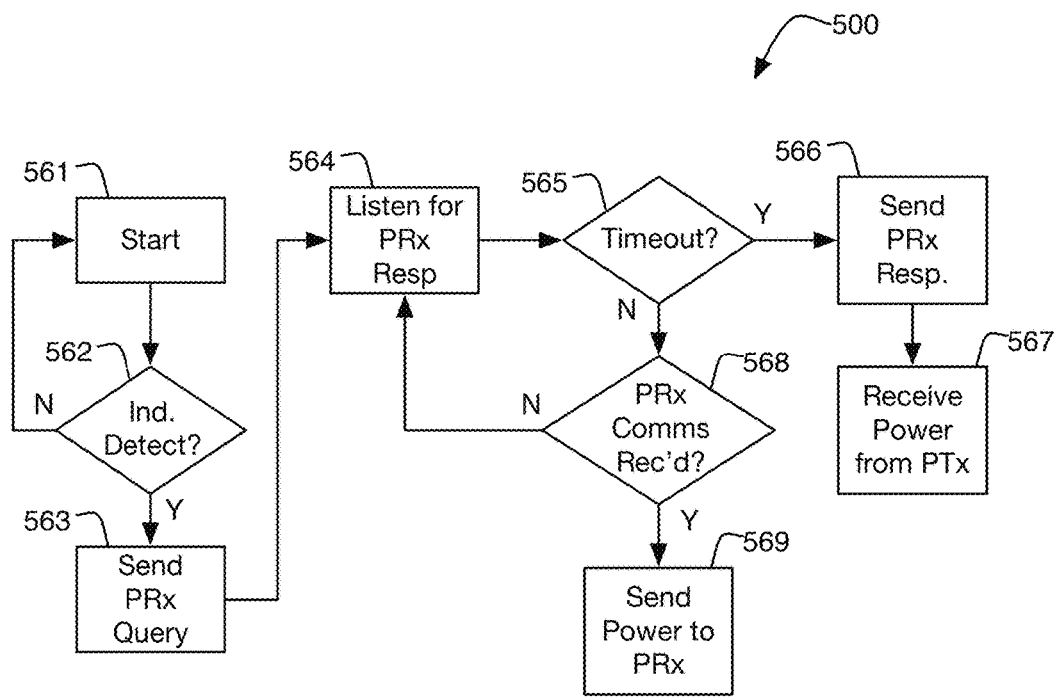
FIG. 4 illustrates a flowchart of a first inductive triggering technique of a wireless power transmitter mode of an electronic device.

FIG. 4 illustrates a flowchart 500 of a first inductive triggering technique of a wireless power transmitter mode of an electronic device (e.g., electronic device 220) capable of receiving or transmitting power wirelessly. As above, the flowchart illustrates exemplary steps in a particular order, but certain steps could be omitted, other steps could be added, and/or the order of at least some steps could be changed if appropriate for a given embodiment. In this case, triggering of the wireless power transfer mode of the device 220 is based on inductive detection of the PRx using the wireless power transfer circuitry of the device detecting corresponding circuitry of the PRx. Otherwise, flowchart 500 can be considered as a subset, simplification, or variation of flowchart 300 described above with respect to FIG. 3. As above, the techniques illustrated in the flowchart can be performed by the device, such as by the wireless power transfer controller and communication circuitry of the device and/or any other control circuitry and/or processor(s)

of such a device in conjunction with or instead of the process illustrated by the flowchart of FIG. 3.

Beginning with Start block 561, the process can proceed to block 562 in which it is determined whether an PRx device has been inductively detected. This inductive detection can take place according to techniques defined by a standard, such as the Qi standards described above, or according to a proprietary technique. In general, such techniques can include periodically measuring one or more electrical or magnetic properties of the device magnetic circuit, such as the quality factor Q of the device's wireless power transfer coil. This Q factor will be different depending on whether it is measured "open air," when no PRx is present, or when an PRx device is present. This difference can be used to determine whether a PRx is present. Additionally, coupled Q can be different depending on whether the wireless power transfer coil of the PRx device is open circuited or short circuited, as described in greater detail below. Other parameters could alternatively or additionally be used, such as resonant frequency, etc., as there are many electrical and magnetic properties that are affected by the presence or absence (i.e., proximity) of a wireless power receiver.

If no PRx device is inductively detected, then the process can return to Start block 561, periodically checking for the presence of an PRx (or potentially a wireless power transmitter, as described in greater detail below). Otherwise, if a potential PRx is detected in block 562, then, in block 563, the device can send a wireless power receiver query to the PRx. That is, the device can transmit and in band signal by modulation of a signal delivered to the wireless power transfer coil. This query can be in accordance with a standard, such as the Qi standards described above, or can be in accordance with a proprietary protocol. In any case, the intent is to establish communication with the potential PRx by transmitting a message that will result in the PRx responding in a known way allowing for its identification. Thus, in block 564, the device can listen for the wireless power receiver's response. This response can be in accordance with the expectation corresponding to the standard and/or proprietary protocol in use. In some embodiments, the device can be configured to attempt to establish communication according to multiple protocols, such as one or more standardized protocols and/or one or more proprietary protocols to allow for interoperability with various wireless power receiver devices.

It may be desirable for there to be a time limit on the time that the device spends waiting for a response from the PRx. Thus, in block 565, the device can determine whether a timeout interval has elapsed. If the timeout of block 565 has expired, then the device can infer that the potential PRx that has been detected in block 562 is actually a wireless power transmitter. Thus, in block 566, the device can send an expected PRx response to the (inferred) wireless power transmitter. As above, this response can be according to one or more standard protocols, e.g., those specified by the Qi standards, and/or can be according to one or more proprietary protocols. In either case, this can result in the device operating as a wireless power receiver and thus receiving power from such wireless power transmitter (block 567). The timeout interval can be chosen to allow for error-free establishment of communication and power transfer with a wireless power transmitter operating according a standard or proprietary scheme. For example, in accordance with at least some embodiments of the Qi standards, a time out interval of 19 ms can allow for the device to establish communication with a wireless power transmitter operating according to such Qi standard. That is, if the PRx begins sending the wireless power receiver response to the device by 19 ms after the initial inductive detection of block 562, the requisite negotiation between the device and the PRx can continue with the device acting in wireless power transmitter mode. Otherwise, if the wireless power receiver response has not begun to be received before the timeout interval (e.g., 19 ms), then the device can transition to wireless power receiver mode and establish communication with the wireless power transmitter before a standardized timeout/communication failure interval expected by the wireless power transmitter. Further aspects of the timing of such signals are discussed in greater detail below with respect to FIG. 5.

Otherwise, if in block 565 the device determines that the timeout has not expired, then it can determine whether it has received an expected wireless power receiver response in block 568. As noted above, such a response can be specified by either a standard or proprietary communication scheme, such as a ping or other message according to the Qi protocol or a modulation of the wireless power transfer signal by the PRx that is understood by the device as identifying a PRx device. In either case, if an appropriate response is received, then the device can operate in a wireless power transfer mode, sending power to the PRx (block 569). Otherwise, the device can continue listening for the response until the timeout expires, causing the device to operate in a wireless power receiver mode as described above.

Figure 5:
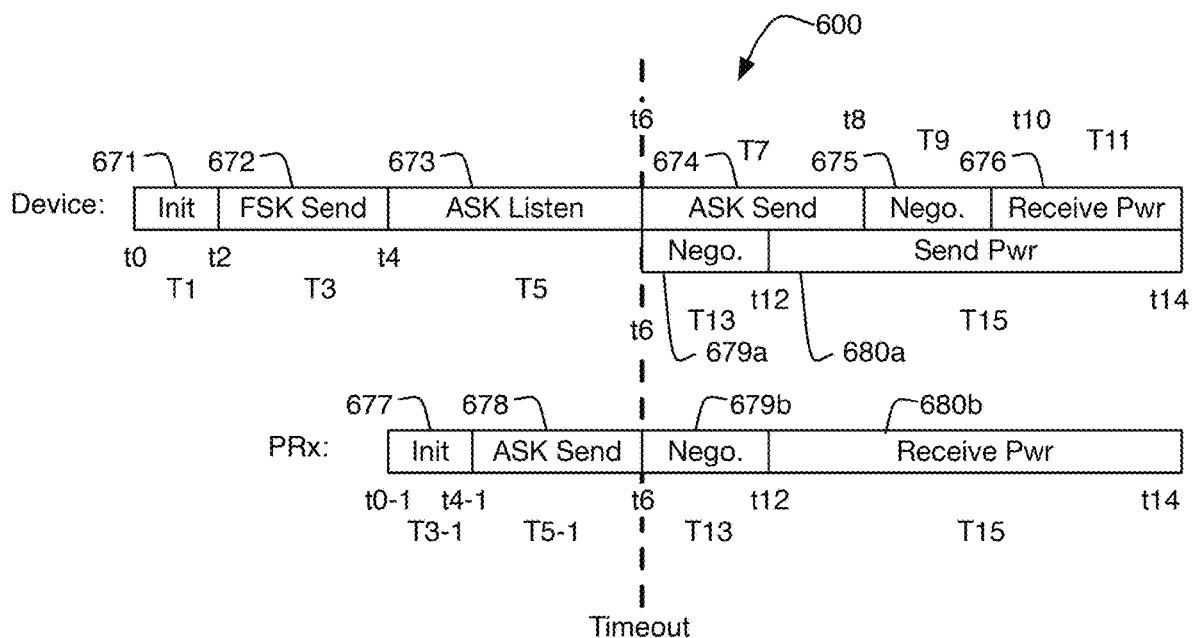
FIG. 5 illustrates a timing sequence for a first inductive triggering technique of a wireless power transmitter mode of an electronic device.

FIG. 5 illustrates a timing sequence 600 for a first inductive triggering technique of a wireless power transmitter mode of an electronic device (e.g., electronic device 220) capable of receiving or transmitting power wirelessly. The timing sequence includes an upper device sequence and a lower PRx sequence. Timing sequence 600 depicts a series of operations or events 671-680*b* that occur over certain time intervals denoted with a capital "T" followed by an odd number (e.g., T1, T3, . . . , T15), with each timer interval having a corresponding beginning or ending time denoted with a lowercase "t" followed by an even number (e.g., t0, t2, . . . , t14). Additionally, the times and time intervals for the PRx are denoted with a "–1" suffix. Beginning with the device, there can be an initialization period 671 during interval T1, beginning at time t0 and ending at time t2.

Following initialization there can be a transmission meant to query whether the detected device is a wireless power receiver. In FIG. 5, this is denoted as FSK Send 672, because according to the Qi standard (and in at least some proprietary wireless power transfer schemes) a wireless power transmitter communicates in band with a wireless power receiver by frequency shift keying (FSK) communications. That is, the wireless power transmitter (in this case the device operating in a wireless power transmitter mode) communicates with a receiver by modulating the frequency of the signal impressed on the wireless power transmitting coil and detectable on the wireless power receiving coil to encode messages to be sent. However, in some embodiments, any suitable query to the detected potential PRx could be used. As illustrated in FIG. 5, FSK Send 672 occurs during interval T3 beginning at time t2 and ending at time t4. However, it is not necessary that the FSK Send 672 or other comparable receiver query occur immediately after initialization, as there could be other intervening activities. In any case, following the FSK Send 672, the device can enter an ASK Listen period 673 that can occur during time period T5 beginning at time t4 (i.e., at the end of the FSK Send 672 or other comparable query) and ending at time t6, which can be the timeout interval described above. Again, this is designated as an ASK Listen because according to the Qi standard and at least some proprietary wireless power transfer schemes, wireless power receivers communicate in band with a wireless power transmitter by amplitude shift keying (ASK) in which the magnitude of the power or current drawn by the wireless power receiver is modulated to encode the information being sent from wireless power receiver to wireless power transmitter.

At time t6, which corresponds to the timeout period described above, device operation diverges depending on whether the device has received an appropriate wireless power receiver reply from the potential PRx. If no reply has been received, the upper branch is followed in which the device operates in a wireless power receiver mode, begun by engaging in an ASK send 674. Again, this is denoted as an ASK Send because at least some standard and proprietary wireless power transfer schemes allow for the wireless power receiver to engage in in band communication with a wireless power transmitter by amplitude shift keying. However, other appropriate wireless power receiver initiation communication may be employed depending on the wireless power transfer scheme being employed. This communication can take place during interval T7 beginning at time t6 (i.e., expiration of the timeout interval) continuing until time t8. Then, during interval T9, beginning at time t8 and continuing until time t10, the device can enter Negotiation 675, during which a wireless power transfer contract can be negotiated and agreed. Thereafter, beginning at time t10, during an interval T11, the device can receive power wirelessly from the wireless power transmitter. As described, this receiving of wireless power transfer can continue until the device's battery is fully charged, or even thereafter if the device is powering other systems from the received wireless power.

Otherwise, if an appropriate wireless power receiver response is received by the device from the PRx, the device can operate in a wireless power transmitter mode depicted in the lower branch of the Device portion of FIG. 5. That is, a Negotiation 679a can take place during interval T13 beginning at or before time t6 and ending at time t12. Thereafter, the device can Send Power 680a for an interval T15 beginning at time t12 and continuing until time t14, which can be associated with a battery of the PRx being fully charged, the PRx being removed from proximity with the device, or the PRx otherwise no longer needing to receive wireless power from the device. These operations can also correspond to the operations of the PRx depicted in the lower PRx path of timing sequence 600.

More specifically, the PRx can begin with an Initialization 677 during an interval T3-1 beginning at a time t0-1 and ending at a time t4-1. The exact timing of this initialization interval with respect to PRx device operation is not critical, although it is expected that it will occur and complete sufficiently early for the PRx to receive the FSK Send 672 discussed above, which prompts the ASK Send 678 by the PRx back to the device, which occurs during interval T5-1, illustrated as beginning at time t4-1 and ending at or before time t6, i.e., the timeout described above. As above, this communication is described as an ASK communication, because such communications are used in at least some standardized and proprietary wireless power transfer and in band communication schemes; however, other communication modes could be employed if desired. Otherwise, the exact timing of ASK Send 678 (or other comparable communication) is not critical, other than that the message must be sent in sufficient time for the device to detect and continue operation in wireless power transmitter mode before it otherwise reverts to wireless power receiver mode as described above. Thus, it may be that ASK Send 678 communication either completes before timeout T6 or that the device can extend the ASK Listen 673 interval if a partial communication has been received to allow the device to enter a wireless power transmitter mode and establish wireless power transfer to the PRx. In any case, beginning at time t6, the PRx can engage in Negotiation 679b corresponding to Negotiation 679a discussed above with respect to the device. These will occur during the same interval T13 discussed above. Once the negotiation is completed, the PRx can Receive Power 680b during interval T15, which corresponds to the Send Power 680a discussed above and also occurring during the same interval.

The timings described above are but one example, and, in some cases, the basic principles described can be implemented with slightly different timings. It may be desirable to select the timings with certain objectives in mind, such as allowing the device to revert to wireless power receiver mode before a wireless power transmitter will determine that a communication failure has occurred and/or allowing for the device to enter wireless power transfer mode and establish wireless power transfer with the PRx as quickly as possible to provide for a better user experience. Otherwise, specific timing requirements may be dictated by a particular wireless power transfer scheme employed, potentially including any in band communication timings associated with such wireless power transfer schemes, whether they be defined by a standard (such as the Qi standards) or one or more proprietary schemes.

Figure 6:
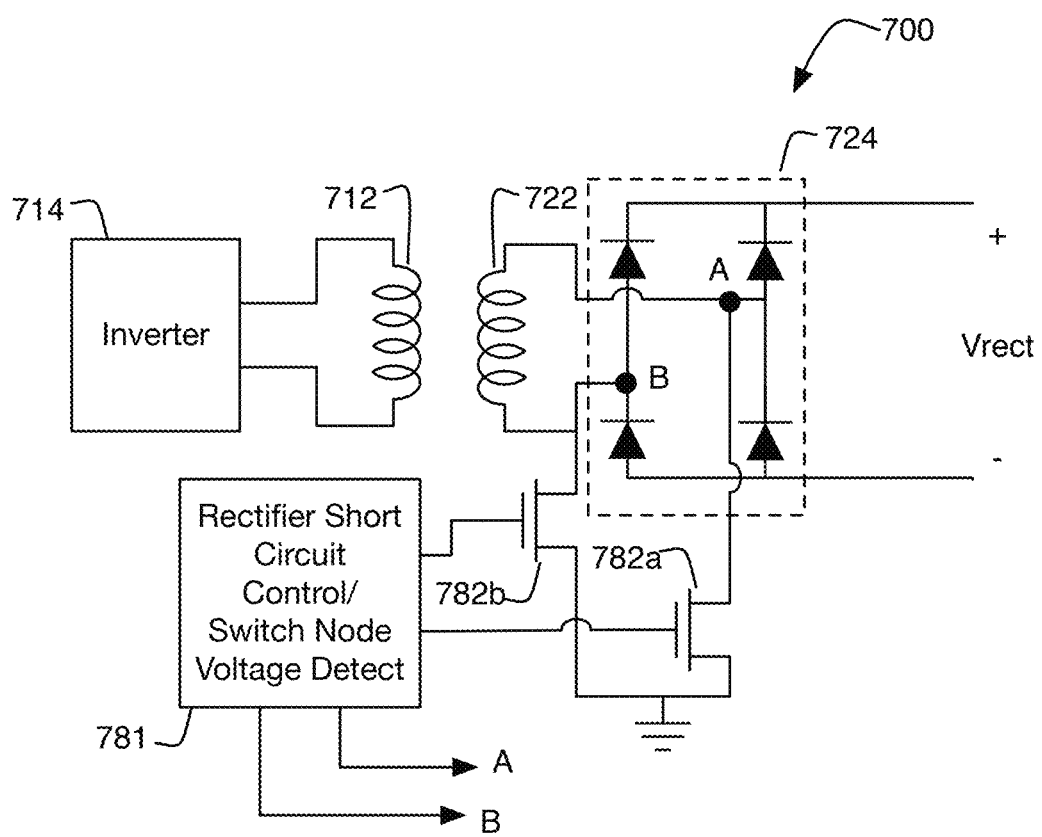
FIG. 6 illustrates a simplified schematic of a wireless power transfer system showing aspects relating to a second inductive triggering technique of a wireless power transmitter mode of an electronic device.
Figure 7:
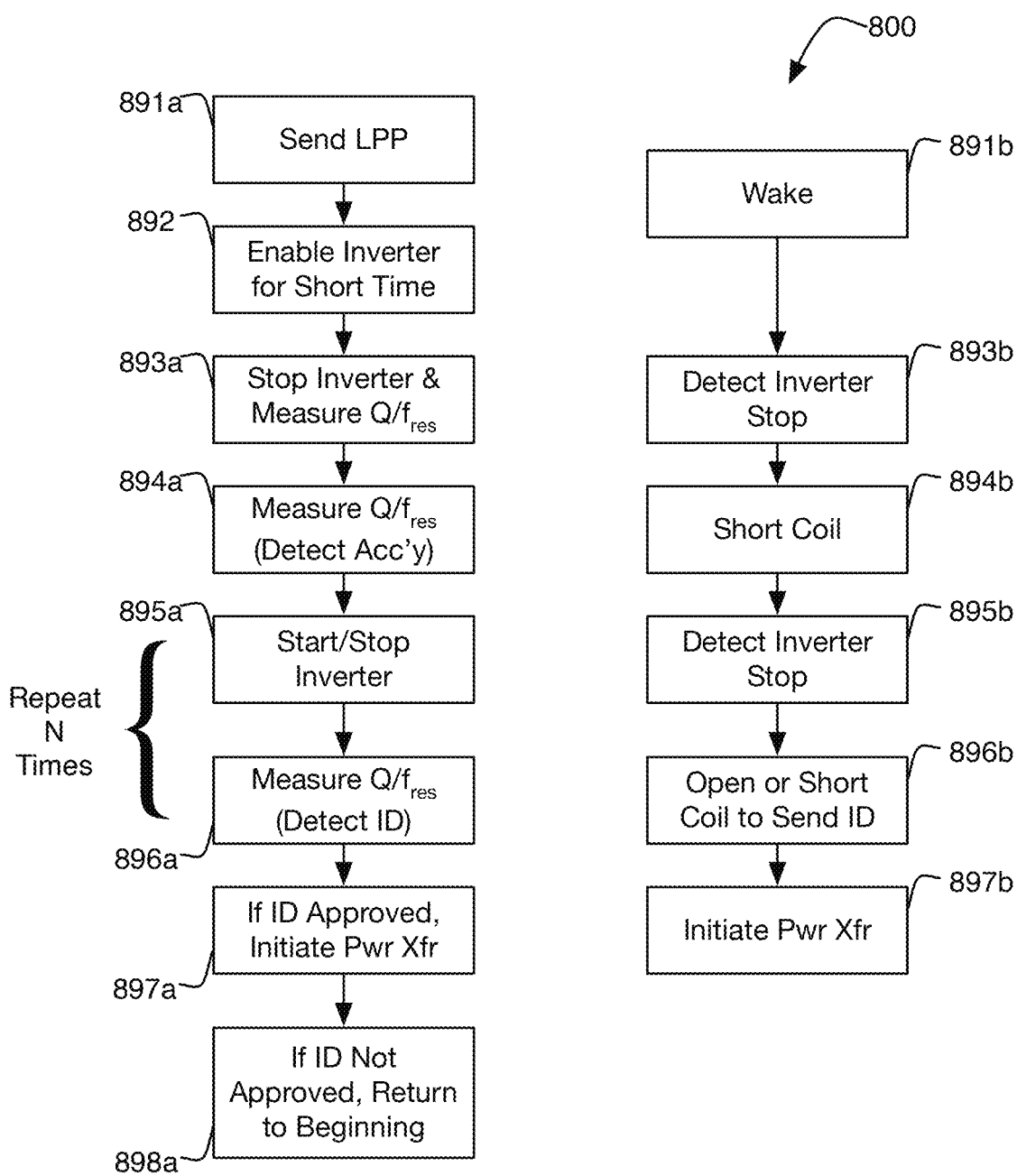
FIG. 7 illustrates a timing sequence for a second inductive triggering technique of a wireless power transmitter mode of an electronic.

Described above with reference to FIGS. 4 and 5 is a first inductive triggering scheme for a wireless power transmitter mode of a device. This first inductive triggering scheme employs particular timings of the communications sent and received by the device to allow it to infer whether it should enter a wireless power transmitter mode and deliver power to an PRx or enter a wireless power receiver mode in which it receives power from a wireless power transmitter. FIGS. 6 and 7 illustrate a second inductive triggering scheme that could also or alternatively be employed. This alternative can be thought of as a "handshake" alternative, in that it relies on special signaling that does not interfere with but is not necessarily specified by a standardized timing arrangement as was described above.

FIG. 6 illustrates a simplified schematic 700 of a wireless power transfer system showing aspects relating to a second inductive triggering technique of a wireless power transmitter mode of an electronic device (e.g., electronic device 220) capable of receiving or transmitting power wirelessly. In the simplified schematic the wireless power transmitter, i.e., device, is represented by inverter 714 and wireless power transmit coil 712. Other components, such as the controller and communication circuitry, wireless power receiving circuitry, omitted wireless power transmitting circuitry, etc. have been omitted for brevity, but can also be included as discussed above. The remaining components of simplified schematic 700 are a simplified representation of the PRx, which are represented by wireless power receiving coil 722 and rectifier 724. Other components, such as the controller and communication circuitry, additional wireless power receiver circuitry, etc. are omitted for brevity, but can be as described above.

Also included in PRx circuitry are switches 782a and 782b and rectifier short circuit control and switch node voltage detection circuitry 781. The latter can be part of the PRx circuitry as described above and can be constructed using any suitable combination of analog, digital, and/or programmable circuitry and/or logic that operates as described in greater detail below. Rectifier short circuit control and switch node voltage detection circuitry 781 can monitor the voltage at the switch node of rectifier 724, represented by points A and B to detect whether inverter 714 of the device is operating or not. Rectifier short circuit control and switch node voltage detection circuitry 781 can also control switches 782a and 782b to selectively short circuit (or open circuit) wireless power receiving coil 722 of the PRx to change the electrical or magnetic circuit properties visible to the device via coupling to wireless power transmitting coil 712. As described below with reference to FIG. 7, this configuration and controlled operation thereof can allow for inductive detection and triggering of wireless power transmitter mode in the device when a suitable PRx is brought within range of the device.

FIG. 7 illustrates a timing sequence 800 for a second inductive triggering technique of a wireless power transmitter mode of an electronic device (e.g., electronic device 220) capable of receiving or transmitting power wirelessly. The left side of FIG. 7 depicts operations that can be performed by the device, e.g., by wireless power transfer control and communication circuitry as described above. The right side of FIG. 7 depicts operations that can be performed by the PRx, e.g., by wireless power transfer control and communication circuitry as described above. Corresponding operations are labeled with a reference number ending with "a" for the device/wireless power transmitter and with a "b" for the PRx device.

Beginning with block 891a, the device can periodically send "low power pings" to detect when a potential wireless power receiver (PRx) is brought in proximity. Such low power pings can be in accordance with a standardized wireless power transfer protocol, such as the Qi standards described above, or can be in accordance with a proprietary wireless power transfer protocol. As an example, a low power ping is an electrical impulse that is provided to the wireless power transfer ping at a power that is lower than the typical voltage and/or wattage levels used for wireless power transfer. Once an potential PRx is detected, in block 892, the device can briefly enable the inverter for a short period of time, e.g., a time on the order of tens of milliseconds, which can allow for a small amount of power to be delivered to the potential PRx, allowing it to perform the operations described below, even if it has a dead battery of other lack of internal power. After this brief time period, the device can stop inverter operation and measure one or more electrical or magnetic properties of the circuit, such as quality factor (Q), resonant frequency, inductance, etc., which will be affected in known ways based on the presence of an PRx and which can be further used to identify the PRx or gain other information about the PRx and/or wireless power link as further described below.

In response to the low power ping 891a and/or brief operation of the device's inverter as described above, the PRx can wake up (block 891b) and detect that the inverter has stopped (block 893b). For example, the PRx's control circuitry can include rectifier short circuit control and switch node voltage detection circuitry 781 as described above with reference to FIG. 6. In response to the device deactivating its inverter, the PRx can short circuit its wireless power receiving coil (block 894b), e.g., by closing switches 782a and 782b described above with reference to FIG. 6, which can likewise be done under the direction of rectifier short circuit control and switch node voltage detection circuitry 781. This short circuiting of the PRx's wireless power receiving coil can be detected by the PRx measuring quality factor Q, resonant frequency $f_{res}$, and/or other suitable electrical or magnetic parameter of the wireless power transfer circuitry) in block 894a. By comparison of the measured quality factor Q and/or other parameter(s) from block 893a with the corresponding measurement made in block 894a, the device can detect that the PRx has short circuited its wireless power receiving coil (in block 894b) and can thus infer that a potential PRx is present and can undertake further operations to identify or characterize such PRx device.

More specifically, operations 895a and 896a can be repeated multiple times. Operation 895a includes starting the inverter and stopping it again after a short period of time. As one example, this time can be on the order of tens of milliseconds, as described above. This starting and stopping of the inverter can have at least two functions. One is to provide a signal and associated timing for communication with the potential PRx, which can be detected by voltage fluctuations at the switch node of the rectifier, as described above. Another is to provide small amounts of power transfer that can be used to power the PRx's wireless power receiving circuitry even if its own battery or other internal power source does not have sufficient power to do so. After each inverter start/stop cycle, the device can measure quality factor Q and/or other parameter(s) to detect respective short circuiting or open circuiting of the PRx wireless power receiving coil by the control circuitry of the PRx device, which can be used to encode identifying information as described below.

Corresponding to device operations 895a and 896a, PRx can perform operations 895b and 896b, which can also be repeated multiple times. In operation 895b, the PRx device (using its controller circuitry) can detect the stopping of inverter operation and, in response thereto can either short circuit its wireless power receiving coil (e.g., by closing switches 782a and 782b) or not short circuit the coil (e.g., by opening switches 782a and 782b) in operation 896b. This can allow the device to detect different quality factor Q and/or other parameter(s) values in operation 896a. As a result, the PRx can communicate data, such as data encoded digitally using 1s and 0s corresponding to whether the PRx short circuits its wireless power receiving coil or not in response to the inverter start/stop operations performed by the device. Thus, each start/stop cycle can allow a single bit of data (for example) to be communicated from PRx to the device. If the cycle is repeated 32 times (for example), then 32 bits of data can be sent. This can include a digital identifier of the PRx, allowing the device to determine whether the PRx is a device that it can appropriately provide wireless power to by activating the device's wireless power transmitter mode of operation (operation 897a). This information exchange from the PRx to device by selective short circuiting of the PRx wireless power transfer coil can be thought of as a "handshake."

In some instances, operation 897a may include further verification or authentication of the PRx device prior to initiating wireless power transfer. For example, some wireless power receivers may be capable of communication with the device via other channels, such as Bluetooth®, WiFi®, NFC, etc. In some cases, this auxiliary channel may also be used for authentication of the PRx either alone or in cooperation with the "handshake." That is, the PRx may communicate its identifying information via one of the other channels, and such identifying information may be used by the device to authenticate the wireless power receiver either independently of the handshake data or in combination with the handshake data. In any case, if the authentication is successful, wireless power transfer can be initiated in operation 897a, otherwise, the device can return to the beginning of the operations depicted in FIG. 7, e.g., periodic low power pings to detect the presence of an PRx. Correspondingly, the PRx device can cooperate with the initiation of wireless power transfer (operation 897b) if the authentication is successful, with the resulting wireless power transfer initiation being completed either according to a standard protocol or a proprietary protocol, as described elsewhere herein.

Figure 8:
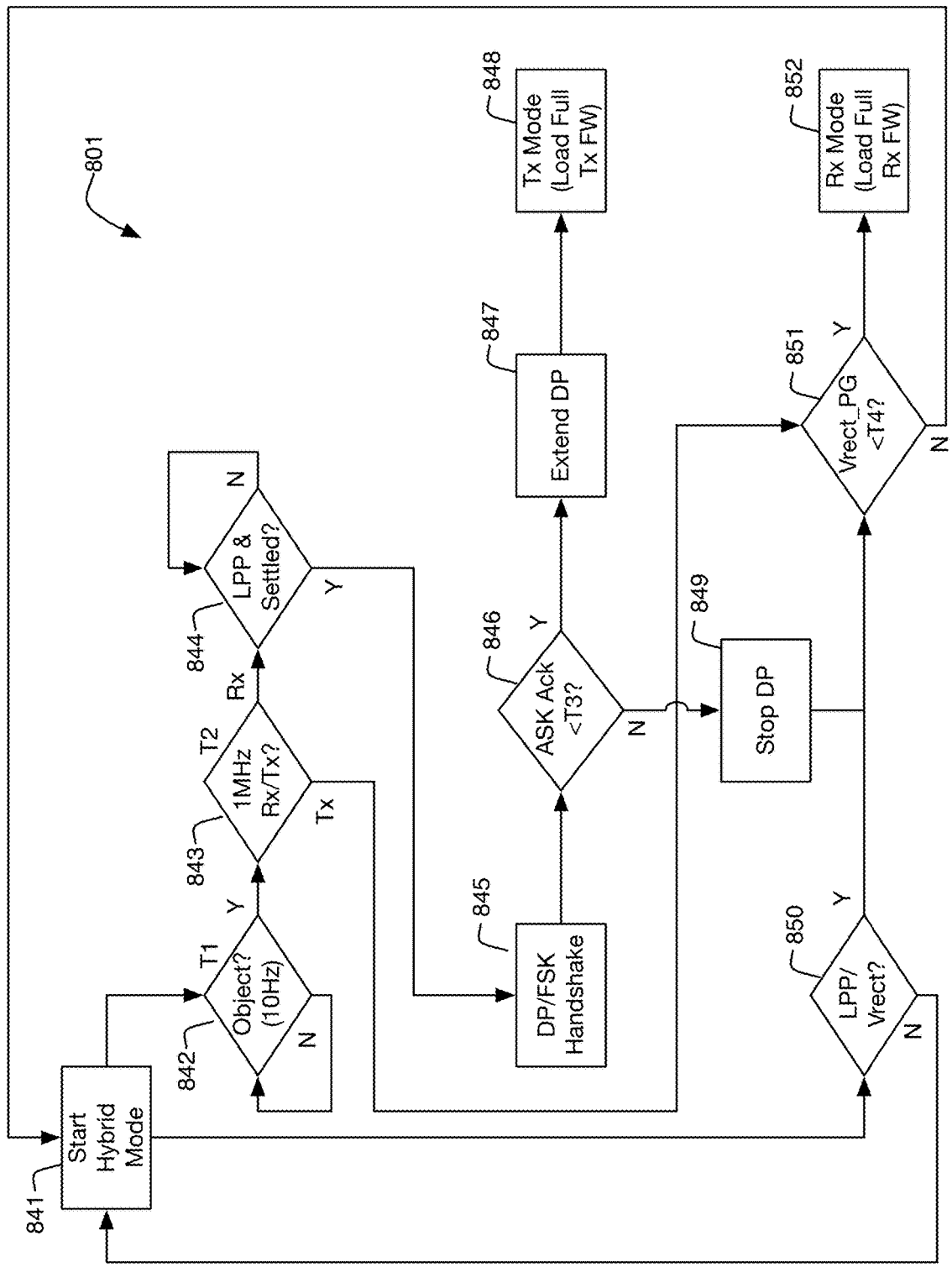
FIG. 8 illustrates a flowchart of an inductive triggering technique to select a wireless power transmitter or wireless power receiver mode in an electronic device.

FIG. 8 illustrates a flowchart of an inductive triggering technique 801 to select a wireless power transmitter mode or wireless power receiver mode in an electronic device capable of operating as either a wireless power transmitter or a wireless power transmitter as was described above. In some applications, the electronic device may have firmware, such as firmware that is stored in and/or executed by control and communication circuitry as described above. In some cases, such firmware may be capable of operating the wireless power transfer circuitry to perform as a wireless power receiver and as a wireless power transmitter, in which case the triggering technique 801 of FIG. 8 can be a mode selection for the combined firmware. In other applications, there may be separate firmware modules relating to wireless power transmitter operation and wireless power receiver operation, in which case the mode selection can also include loading the appropriate firmware once the electronic device (for example, acting through its wireless power transfer system control and communication circuitry) determines the desired operating mode. In either case, the technique can begin with block 841 in which the electronic device is operating a hybrid mode that can allow the device to detect when a wireless power receiver or a wireless power transmitter is brought in proximity to the electronic device. If a wireless power receiver is brought in proximity, then the electronic device can operate in a wireless power transmitter mode. Alternatively, if a wireless power transmitter is brought in proximity, then the electronic device can operate in a wireless power receiver mode.

In block 842, the electronic device can perform what is described herein as ultra low power object detection or uLPOD. This uLPOD operation is described in greater detail below with respect to FIGS. 9 and 10. For purposes of this discussion, the uLPOD mode can be thought of as a very low power technique for detecting the presence of an object in proximity to the electronic device. In some prior art wireless power transfer systems, object detection operations were accomplished using low power pings "LPP" that supply intermittent pulses to the wireless power transfer coil using the wireless power transfer circuitry (such as the inverter of a wireless power transmitter). The presence of an object, such as a foreign object or a counterpart wireless power transfer device, can change the magnetic and/or electrical properties of the wireless power transfer circuit, and can thus allow for detection of such an object by measuring the response to such intermittent pulses/low power pings. However, using the wireless power transfer circuitry for this purpose can, in at least some instances, result in higher power consumption that may be undesirable for some implementations. Thus, as described below with respect to FIG. 9, alternative circuitry can be provided to stimulate the wireless power transfer coil of the electronic device with periodic pulses having a smaller magnitude and a lower frequency than conventional LPP or other similar pulses, thus allowing for object detection with lower power consumption. As one example, the uLPOD pulses can be provided by an auxiliary circuit to the wireless power transfer coil at a frequency of 10 Hz. If a change in the circuit parameters corresponding to the presence of an object is not detected within a certain time period T1 (e.g., on the order of 100s of milliseconds), operation in block 842 can continue until such an object is detected.

Otherwise, if in block 842, presence of an object is detected by response to the uLPOD pulses, then, in block 843, further identification steps can be performed to identify the object that has been brought in proximity. These techniques, described in greater detail below with reference to FIGS. 10 and 11 can be used to characterize whether the object is a wireless power receiver device or a wireless power transmitter device. In some embodiments, this can include a frequency sweep signal applied to the wireless power transfer coil, with the frequency response being used to characterize the object as a wireless power transmitter, a wireless power receiver, a foreign object, free air, etc. If the detected object is identified as a wireless power transmitter, processing proceeds to block 851, where the path toward operating the electronic device in wireless power receiver mode can be selected, as described in greater detail below. Otherwise, if the detected object is characterized as a wireless power receiver at block 843, then the electronic device can proceed toward block 844, and operate in wireless power transmitter mode. In some implementations, processing defaults to proceeding from block 843 to 844 if the detected object is characterized as not being a wireless power transmitter. As described in greater detail below, the identification process may take on the order of 10s of milliseconds.

Continuing toward operating the electronic device in wireless power transmitter mode, in block 844 the electronic device, for example, using its wireless power transfer system control and communication circuitry, can provide low power pings (LPP) to determine whether the presumed wireless power receiver device is in a settled position suitable for commencing wireless power transfer. In some embodiments, this can include operation in compliance with one or more industry standard protocols for wireless power transfer, such as the Qi family of wireless power transfer standards promulgated by the Wireless Power Consortium, including but not limited to the Magnetic Power Profile (MPP) standards. In some embodiments, the operations of block 844 could also or alternatively include one or more proprietary protocols for detecting that a wireless power receiving device is present in a stable position to establish wireless power transfer. The operations of block 844 can continue until such time as the wireless power receiving object is settled in a position suitable for initiation of wireless power transfer.

Then, in block 845, the electronic device can initiate a digital ping and FSK handshake to initiate wireless power transfer with the wireless power receiving device. In some embodiments, this can be done in accordance with an industry standard wireless power transfer protocol, such as the Qi protocols described above. In other embodiments, this could alternatively or additionally be done in accordance with a proprietary wireless power transfer protocol. In many cases, such as wireless power transfer devices operating according to the Qi protocols, a wireless power transmitter can communicate with a wireless power receiver using in-band communications accomplished by modulation of the wireless power signal using frequency shift keying, in which data is encoded by perturbation of the frequency of the wireless power transfer signal (e.g., by the wireless power transmitter modulating the switching frequency of its inverter). Similarly, a wireless power receiver can communicate with a wireless power transmitter using in-band communication accomplished by modulation of the wireless power signal using amplitude shift keying (ASK), in which data is encoded by perturbation of the amplitude of the wireless power transfer signal (e.g., by the wireless power receiver modulating its load).

Thus, after initiating an FSK handshake in block 845, the electronic device can, in block 846, await an ASK acknowledgment from the wireless power receiving device. In some cases, there may be a timeout (e.g., first threshold T3). If the ASK acknowledgement is not received within this time frame (which may but need not be specified by the standard or proprietary protocol in use), then in block 849, the digital ping can be stopped, and the electronic device can transition to the receiver mode path as described in greater detail below. Otherwise, if the ASK acknowledgement is received from the device, then, in block 847 the digital ping process can be extended, with the electronic device transitioning to the wireless power transmitter operating mode in block 848, which can include loading the full wireless power transmitter firmware, if necessary.

Part of the hybrid operating mode of block 841 can also include watching for object detection signals, such as low power pings or ultra low power object detection (uLPOD) pulses associated with a wireless power transmitter in block 850. This operation can be continuous or intermittent and can be conducted in parallel with the object detection operations described above. If the electronic device is brought in proximity with a wireless power transmitter, the wireless power transmitter will emit object detection signals, e.g., according to one or more of the techniques and/or Qi standards described above. If these object detection signals are detected, then the electronic device can infer that it is in proximity to a wireless power transmitter and can thus initiate a wireless power receiver mode of operation. In some cases, the presence of a wireless power transmitter in proximity to the electronic device can also be detected by the presence of a rectifier output voltage (Vrect) in the electronic device's wireless power transfer system that is induced by the low power pings or other comparable operation.

In any case, if an object detection ping or rectifier output voltage Vrect is detected, then in block 851, the electronic device can determine whether its rectifier output voltage Vrect has reached a determined threshold value within a second time threshold T4. This is also the point where the process will arrive if no ASK acknowledgement is received in block 846 discussed above. In either case, if Vrect has not reached the programmed threshold within the time threshold T4, then processing can return to block 841 and the above-described detection modes can continue. Otherwise, if so, then the electronic device can operate in the wireless power receiver mode (block 852), which can include loading the wireless power receiver firmware modules if required.

Figure 9:
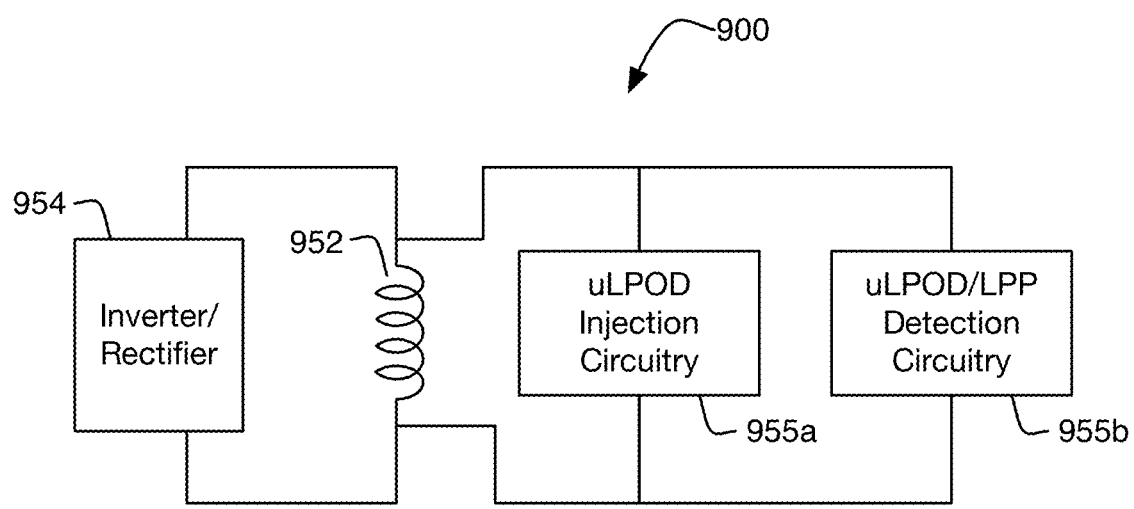
FIG. 9 illustrates a simplified schematic diagram of ultra low power object detection injection and detection circuitry and low power ping detection circuitry for an electronic device.

FIG. 9 illustrates a simplified schematic diagram 900 of ultra low power object detection (uLPOD) pulse injection circuitry 955*a* and uLPOD and low power ping (LPP) detection circuitry 955*b* for an electronic device. As described above, a wireless power transmitter can include an inverter 114 that drives a wireless power transmitting coil 112. Likewise, a wireless power receiver can include a rectifier 124 that is driven by a wireless power receiving coil 122. For an electronic device capable of operating either as a wireless power transmitter or a wireless power receiver, the coil can be generalized to a wireless power transfer coil 952, which can be coupled to an inverter and/or rectifier (which can use the same switching devices or separate switching devices, as desired), represented by inverter/rectifier 954. As described above it can be advantageous to provide for uLPOD pulses that stimulate wireless power transfer coil 952 to detect the presence of an object (such as a foreign object, wireless power transmitter, or wireless power receiver) in proximity to the electronic device while using less power than would be consumed by using the inverter/rectifier 954 to provide these signals.

To that end, uLPOD injection circuitry 955*a* can be provided so as to be coupled to wireless power transfer coil 952. The uLPOD injection circuitry 955*a* can be part of the controller and communication circuitry of the wireless power transfer system of the electronic device or can be separate circuitry as appropriate for a given embodiment. Thus, uLPOD injection circuitry 955*a* can include uLPOD injection circuitry that generates the uLPOD pulses described above with reference to FIG. 8 and below with reference to FIG. 10. For example, these pulses may be supplied at a relatively low rate (e.g., 10 Hz) and can have a relatively small value, (e.g., 1.2V). In some embodiments, a 1.2V square wave generator could be provided for generating such pulses. However, this is merely one example, and other waveforms of other amplitudes and/or frequencies could be used as appropriate to achieve the desired uLPOD pulses that can consume less power than object detection techniques relying on the inverter/rectifier 954 to generate LPP or similar pulses. The system can also include uLPOD/LPP detection circuitry 955*b* that can monitor wireless power transfer coil 952 for measuring the response to the uLPOD. Such circuitry might include voltage and/or current sensors, amplifiers, sample and hold circuits, comparators, analog to digital converters, mixers, etc., depending on the measurement techniques to be employed. The uLPOD injection circuitry 955*a* and uLPOD/LPP detection circuitry 955B may be selectively alternately coupled to the wireless power transfer coil by suitable switching circuitry, etc. Additional protection circuitry may also be provided that responds to a received wireless power signal to selectively disable the uLPOD circuitry, as a wireless power signal could be large enough to damage the uLPOD circuitry configured to operate at much lower amplitude and power levels.

In some embodiments, uLPOD/LPP detection circuitry 955*b* can include further circuitry for detecting a low power ping (LPP), such as that provided by a wireless power transmitter operating according to one or more of the Qi standards described above. Depending on the particulars of the system, this can be the same circuitry as the uLPOD detection circuitry described above or could be separate circuitry as appropriate for a given embodiment and the respective characteristics of the uLPOD signals and the LPP signals.

Figure 10:
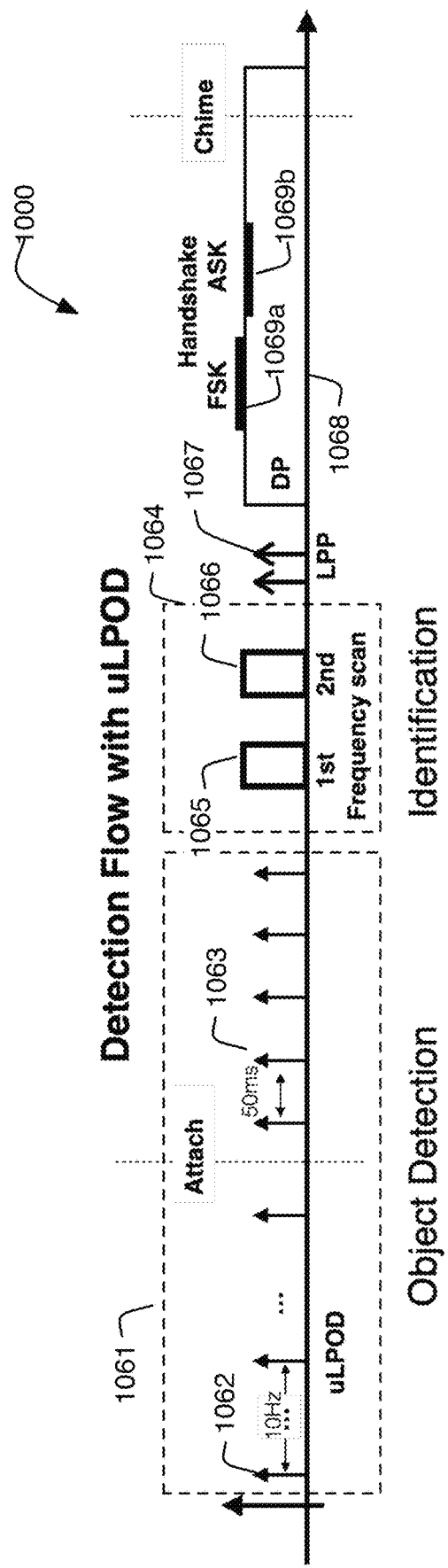
FIG. 10 illustrates a timing sequence for a detection and identification technique for a wireless power receiver in an electronic device.

FIG. 10 illustrates a timing sequence for a detection and identification technique 1000 for a wireless power receiver in an electronic device. Timing sequence 1000 can include an object detection segment 1061, which can correspond to block 842, discussed above with reference to FIG. 8. Timing sequence 1000 can also include an identification segment 1064, which can correspond to block 843, discussed above with reference to FIG. 8. Timing sequence 1000 can also include a low power ping (LPP) segment 1067, which can correspond to block 844, discussed above with reference to FIG. 8. Timing sequence 1000 can also include a digital ping and FSK/ASK handshake segment 1068, which can correspond to blocks 845-848 discussed above with reference to FIG. 8.

More specifically, object detection segment 1061 can include sending a plurality of uLPOD pulses 1062. As described above, these pulses can be sent at a relatively low rate (e.g., 10 Hz) and can have a relatively low magnitude (e.g. 1.2V), although other pulse rates and magnitudes could be used. During this time, the electronic device can monitor the response of its wireless power transfer coil, as the presence of an object, such as a foreign object, a wireless power receiver, or a wireless power transmitter, can load the wireless power transfer coil in such a way that the response to the uLPOD pulses can be detected, e.g., using the circuitry described above with reference to FIG. 9. In some cases, during object detection phase, the electronic device can increase the pulse rate of the uLPOD pulses if a response indicates that a device may be present. For example, uLPOD pulses 1063 may be sent at a shorter interval (e.g., 50 ms) to confirm that a device has been brought into proximity, with the more frequent measurements or observations being able to provide a more reliable indication.

Identification segment 1064 can be performed in a variety of ways. In some embodiments, one or more frequency scans or sweeps 1065, 1066 can be performed. As described in greater detail below with reference to FIG. 11, various objects detected by the object detection segment 1061 may respond differently at different frequencies. That is, the effect that these various objects have on the electrical and magnetic properties of the circuit including the wireless power transfer coil of the electronic device can cause different responses, as described below with reference to FIG. 11. Thus, by performing the one or more frequency scans 1065, 1066, the type of object that has been brought in range of the electronic device can be characterized as a wireless power receiver (leading to activation of electronic device's wireless power transmitter mode), a wireless power transmitter (leading to activation of electronic device's wireless power receiver mode), or a foreign object (leading to reduction and/or inhibition of wireless power transfer, for example).

The frequency scan(s) 1065, 1066 can be performed using either the wireless power transfer circuitry itself (e.g., inverter 114 of a wireless power transmitting circuit in the electronic device), or can be performed by auxiliary circuitry (e.g., uLPOD injection and detection and LPP detection circuitry 955). In either case, the circuitry can be operated to provide a signal that sweeps a desired frequency range and the response can be measured at the various frequencies. By detecting one or more peaks (corresponding to resonant frequencies, as discussed below), an object in proximity to the electronic device can be characterized as a wireless power receiver, a wireless power transmitter, a foreign object, etc. In some embodiments the frequency range may be from about 600 kHz to about 2 MHz, although the particular range of interest can correspond to the designed wireless power transfer frequency, characteristics of the counterpart devices, etc. The frequency sweep can be implemented by providing a continuous sweep of the range of interest or, in some embodiments, by providing discrete signals at a fixed interval over the range. For example, the frequency range of interest could be broken down into intervals of 25 kHz to 100 kHz. In this latter case, each frequency step may be operated for a given period of time, e.g., about 0.5 ms, although other times could also be used. This can result in a few to several dozen measurements at different frequencies being used to generate a response curve like those described below with reference to FIG. 11. Characterizing this curve as described in greater detail below, can thus identify the object in proximity to the electronic device.

Assuming that identification segment 1064 (e.g., the associated frequency scan(s) 1065, 1066) determines that the object detected during the object detection segment 1061 is a wireless power receiver, then the electronic device can commence low power pings 1067, as described above with respect to block 844 of FIG. 8. Thereafter, the wireless power transmitter mode operation of the electronic device can continue with digital pings (DP) in digital ping and FSK/ASK handshake segment 1068. These can be followed by an FSK handshake initiation (1069a) and an ASK handshake response 1069b from the wireless power receiver. As described above, the result can be establishment of wireless power transfer from the electronic device to the wireless power receiver, either in accordance with an industry standard wireless power transfer protocol or a proprietary wireless power transfer protocol. In either case, establishment of wireless power transfer can be indicated to the user by a chime or other audible, visual, or other feedback mechanism following the negotiation and establishment of wireless power transfer.

Figure 11:
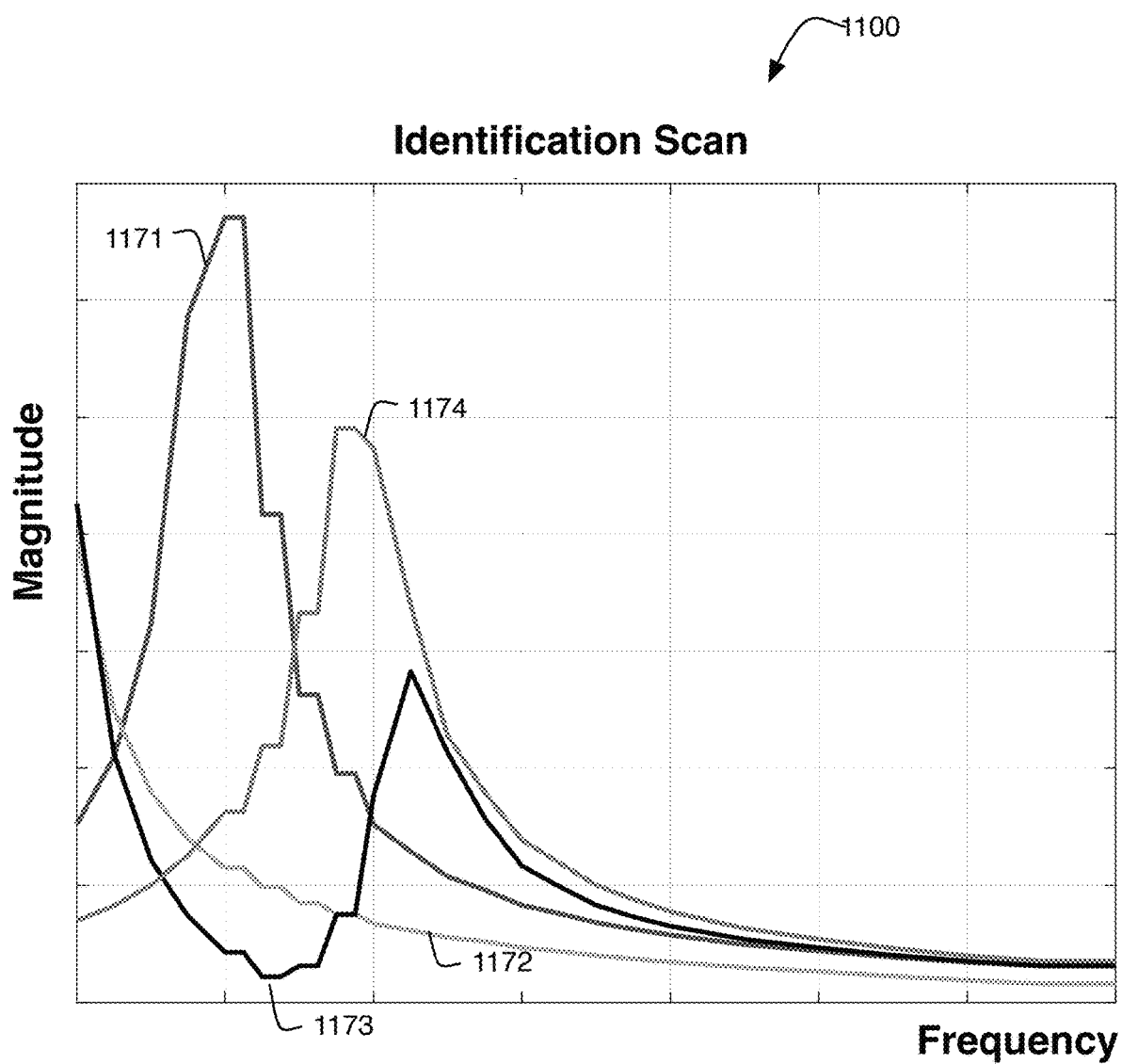
FIG. 11 illustrates a series of identification frequency response curves for detection and identification of a wireless power receiver or a wireless power transmitter by an electronic device.

FIG. 11 illustrates a plot 1100 of series of identification frequency response curves 1171-1174 for detection and identification of a wireless power receiver or a wireless power transmitter by an electronic device. These response curves 1171-1174 can correspond to exemplary responses to the frequency sweep(s) or scan(s) as described above. Curve 1171 can correspond to free air, meaning that the resonant peak is just that of the electronic device's own wireless power transfer circuitry uninfluenced by external components. In some embodiments, this curve may correspond to a single peak at a frequency of about 800 kHz, although this can vary with construction of the electronic device itself, its wireless power transfer circuitry (including the designed operating frequency), etc. Curve 1172 can correspond to a wireless power transmitter device. In at least some embodiments, such devices may be characterized by a single peak, e.g., the single peak located at about 600 kHz, although this too can vary with construction of the electronic device, the wireless power transmitter, their respective wireless power transfer circuitry (including the designed operating frequency), etc. This transmitter peak or resonant frequency can be a known frequency associated with a wireless power transmitter that is intended for operation with the device. This transmitter peak or resonant frequency can also be any frequency that is known to be different than a receiver resonant frequency associated with wireless power receivers intended for operation with the device. Curve 1173 can correspond to a wireless power receiver device. In at least some embodiments, such devices may be characterized by a double peak with a valley in between, e.g., the illustrated valley at 850 kHz, although this too can vary with construction of the electronic device, the wireless power receiver, their respective wireless power transfer circuitry (including the designed operating frequency), etc. These receiver peak or resonant frequencies and/or the corresponding valley frequency can be known frequencies associated with a wireless power receiver that is intended for operation with the device. These receiver peak or resonant frequencies and/or the corresponding valley frequency can also be any frequency that is known to be different than a transmitter resonant frequency associated with wireless power receivers intended for operation with the device. Finally, a foreign object (i.e., an object that is neither a wireless power transmitter nor a wireless power receiver) might be characterized by some other pattern, such as the illustrated peak at 1 MHz for curve 1174.

In implementing a given electrotonic device and its wireless power transfer system, the known properties of such device, along with the expected properties of the wireless power transmitters and/or receivers with which it is expected to operate, can allow for the designer to set appropriate thresholds or other criteria for the resonant peak and/or valley frequencies and/or magnitudes to identify objects as desired. Thus, the control and communication circuitry of the wireless power transfer system of the electronic device can perform one or more frequency sweeps or scans as described above and monitor and characterize the response as described above using signal processing circuitry such as voltage and/or current sensors, sample and hold circuits, analog to digital converters, envelope detectors, comparators, etc. to determine whether an object detected by the uLPOD detection sequence is a wireless power transmitter or wireless power receiver, thereby enabling the electronic device to select an appropriate operation mode for its wireless power transfer circuitry.

Figure 12A:
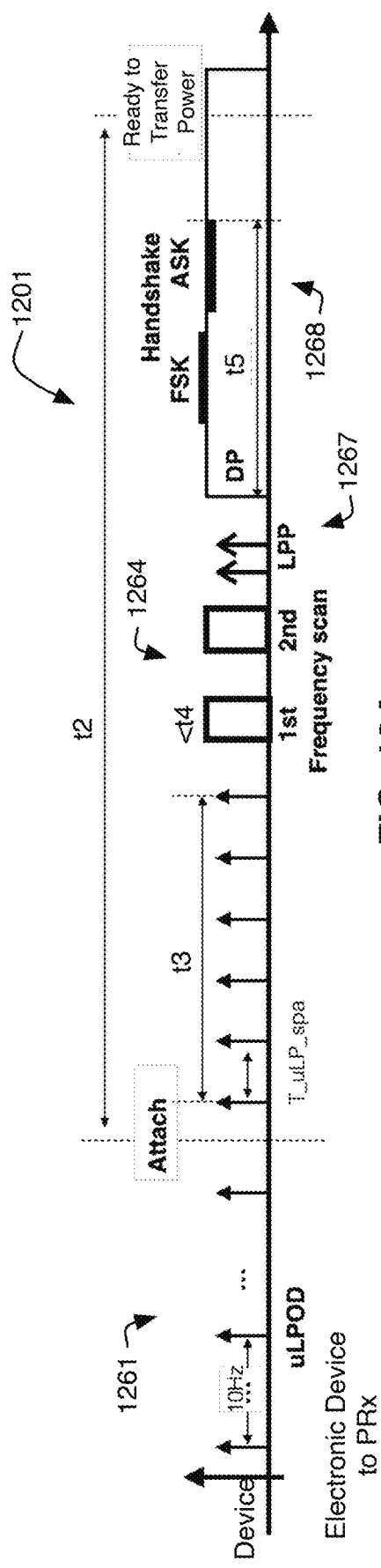
FIGS. 12A-12C illustrate alternative timing sequences for detection and identification of a wireless power receiver or a wireless power transmitter in an electronic device.
Figure 12B:
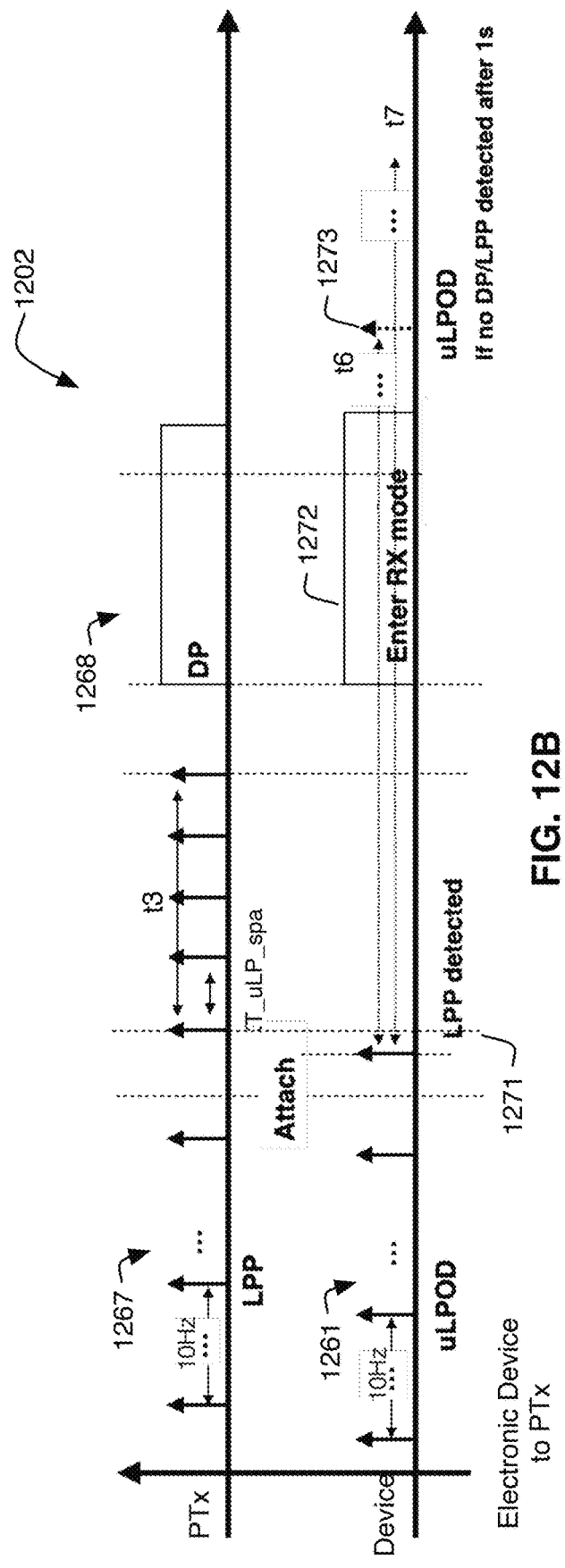
Figure 12C:
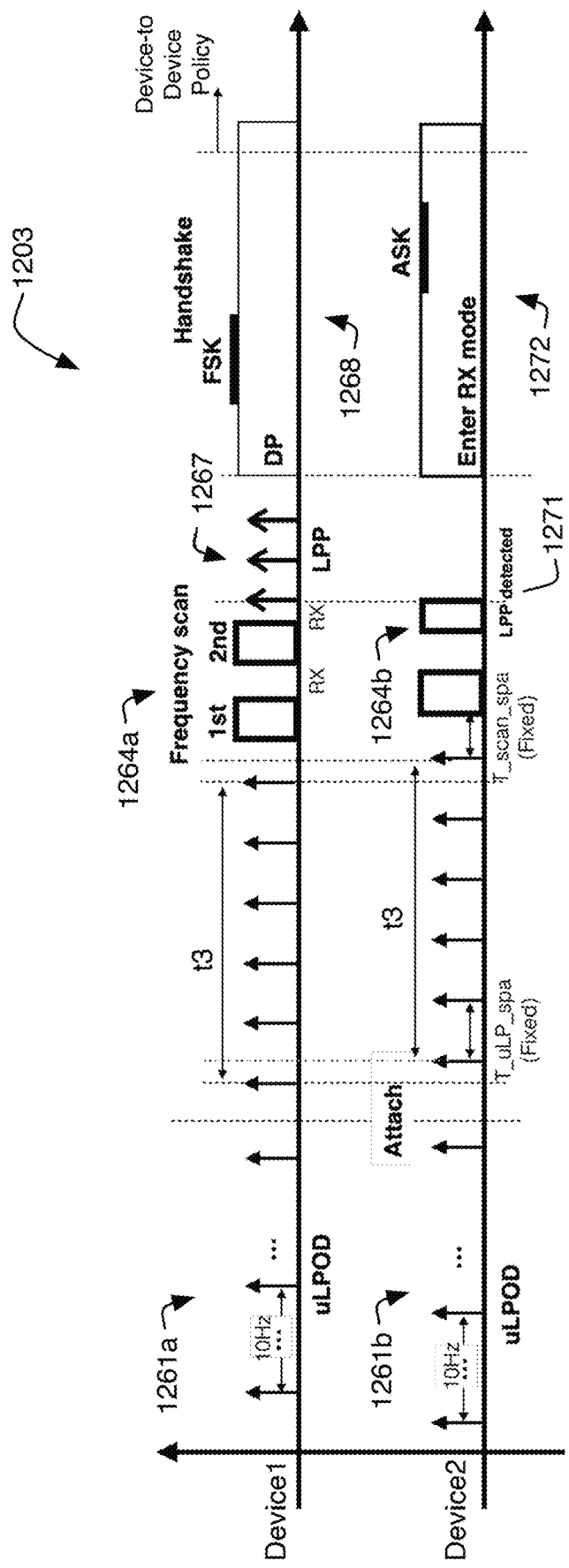

FIGS. 12A-12C illustrate alternative timing sequences for detection and identification of a wireless power receiver or a wireless power transmitter in an electronic device. FIG. 12A illustrates an example 1201 like that of FIG. 10 above in which the electronic device detects a wireless power receiving device and operates as a wireless power transmitter to supply power to the wireless power receiver. Operation in such a mode was described above and thus will not be repeated in detail here. In general, detection segment 1261 corresponds to detection segment 1061 with the associated uLPOD pulses. Similarly, identification segment 1264 corresponds to identification segment 1064, including the above-described frequency scans. These are followed by a LPP segment 1267, corresponding to LPP segment 1067 and followed by digital ping/handshake segment 1268, corresponding to digital ping and FSK/ASK handshake segment 1068. The illustrated frequencies, timing, etc. in the example are merely examples, and other timing intervals could be provided. In general, it may be desirable to provide for a relatively short interval, such as the illustrated t2 between initial device detection and establishment of electronic device operation as a wireless power transmitter (or receiver) to provide for a suitable user experience. In some embodiments interval t2 may be on the order of about 700 ms. To achieve this, the latter uLPOD pulses may have a total duration of t3, which could be on the order of about 300 ms. The frequency scans 1264 could be completed in less than some time interval t4, which could be on the order of about 20 ms. Finally, the digital ping and FSK/ASK handshaking interval t5 could be on the order of about 200 ms. Again, these values are merely examples and can vary depending on the particular application, etc.

FIG. 12B illustrates an example 1202 in which the electronic device detects a wireless power transmitter device and operates as a wireless power receiver to receive power from the wireless power receiver. The upper sequence illustrates operation of the wireless power transmitter (PTx), while the lower sequence illustrates operation of the electronic device. Initially, the wireless power transmitter can be operating in a LPP mode (e.g., as defined by one or more of the Qi standards discussed above). Simultaneously, the electronic device may be operating in a detection mode 1261 involving uLPOD signals as described above. At time 1271, the electronic device may detect the LPP signals from the wireless power transmitter, thus beginning initiation of the wireless power receiver operating mode for electronic device, as described above with reference to blocks 850 and following of FIG. 8. As a result, wireless power transmitter PTx can continue its LPP operation and initiate a digital ping phase EP68 as per the operating protocol. Correspondingly, the electronic device, upon transitioning to the wireless power receiver operating mode, can enter the wireless power receiver mode, and at 1272 begin monitoring its rectifier output voltage Vrect and establishing wireless power transfer (reception) according to the relevant protocol. As in the example of FIG. 12A, the illustrated timings are merely exemplary. For example, the interval t3 of the more frequent uLPOD pulses may be about 185 ms. If, upon entering the receiver mode, the device does not detect a low power ping from the transmitter within an interval t6, for example on the order of 1s, then the device can resume sending uLPOD pulses 1273, which can continue for an interval t7, e.g., up to several seconds. In other words, as indicated by uLPOD signal 1273, if the electronic device is unable to establish wireless power transfer (reception) from the wireless power transmitter PTx, it can resume searching for a wireless power transmitter or wireless power receiver object as described above with reference to FIG. 8.

FIG. 12C illustrates an example 1203 in which two electronic devices each capable of bidirectional wireless power transfer operation (i.e., as a wireless power transmitter and as a wireless power receiver) are brought within proximity. The upper sequence illustrates operation a first such device (Device 1), while the lower sequence illustrates operation of a second such device (Device 2). Initially, each device can be in a detection segment 1261a/1261b as described above with reference to FIGS. 12A and 12B. In some cases one device or the other (in this case the second device) may have a different time interval T_uLP_spa (i.e., uLPOD signal spacing) to prevent race conditions associated with both devices sending and receiving uLPOD signals at the same time. In any case, as each device detects the other using a uLPOD operation as described above, each device can independently transition to its respective identification interval 1264a/1264b. As a result, each device can perform one or more frequency sweeps or scans as described above. Again, one or the other device (in this case the second device) may have a scan offset interval T_scan_spa causing its scans to occur after the scans of the first device. As a result, the first device will detect the second device as a wireless power receiver and begin its LPP operation 1267. The second device can detect this LPP signal from the first device, thus proceeding to operation as a wireless power receiver, on the understanding that the first device is a wireless power transmitter. Timings for the various operations and intervals can be generally similar to those described above.

In some embodiments one or both devices could randomize a time interval between the end of the frequency sweep or scan for identification of the other device and the subsequent LPP pulses. In another embodiment, one or both devices could randomize a time interval between a first LPP pulse and subsequent LPP pulses. This can account for the situation in which two devices step through the sequence at substantially the same time, which could prevent them from detecting each other's LPP pulses, as respective LPP pulses transmitted each device could "drown out" the signal associated with the LPP from the counterpart device, effectively preventing the devices from detecting each other's LPP pings. By randomizing the interval between LPP pulses, e.g., between the first and second and second and subsequent pulses, issues associated with such collisions can be mitigated.

As a result, the second device can transition to wireless power receiver operating mode. Thus, the first device can enter a digital ping phase 1268, which can include an FSK handshake. Correspondingly, the second device, having entered, the wireless power receiver mode, can at 1272 begin monitoring its rectifier output voltage Vrect and establishing wireless power transfer according to the relevant protocol, such as an industry standard Qi protocol or a proprietary protocol. This can include the ASK portion of the handshake. Once the devices have established wireless power transfer, they can apply a device-to-device power transfer policy to decide which may include different transmitting and receiving roles than those initially negotiated according to the operations above. For example, even though the second device may be later in detecting the other, and thus subject to receiving LPP signals from the first device operating in wireless power transmitter mode, it may be that conditions warrant that the second device supply power to the first, in which case the devices can renegotiate their transmitter/receiver relationship according to an appropriate policy. Details of such policies are beyond the scope of this application, although they may be based on relative states of charge of the batteries respective devices, total battery capacities of the respective devices, etc.

Described above are various features and embodiments relating to wireless power transfer devices capable of operating in a wireless power transmitter mode or in a wireless power receiver mode, as well as techniques for transitioning between such modes. Such arrangements may be used in a variety of applications but may be particularly advantageous when used in conjunction with electronic devices such as mobile phones, tablet computers, laptop or notebook computers, and wireless power receivers including accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information between the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

The invention claimed is:

1. An electronic device selectively operable in a wireless power receiver mode to receive power from a wireless power transmitter and in a wireless power transmitter mode to transmit power to an accessory, the electronic device comprising:

a wireless power transfer coil;

a rectifier coupled to the wireless power transfer coil and operable in the wireless power receiver mode to convert an AC voltage induced in the wireless power transfer coil by a wireless power transmitter to a DC voltage for use by the electronic device;

an inverter coupled to the wireless power transfer coil and operable in the wireless power transmitter mode to convert a DC voltage to an AC voltage applied to the wireless power transfer coil; and controller and communication circuitry that:
 detects an object in proximity to the electronic device by using the wireless power transfer coil to transmit a plurality of low power object detection pulses and detect a response to the low power object detection pulses associated with the object, wherein the low power object detection pulses are generated by the controller and communication circuitry without using the rectifier or the inverter;
 responsive to detecting the object, identifies the object as one of at least a wireless power receiver and a wireless power transmitter;
 responsive to identifying the object as a wireless power receiver, activates the wireless power transmitter mode; and
 responsive to identifying the object as a wireless power transmitter, activates the wireless power receiver mode.

2. The electronic device of claim 1 wherein the response to the low power object detection pulses associated with the object is a change in one or more electrical or magnetic parameters of a circuit including the wireless power transfer coil.

3. The electronic device of claim 1 wherein the low power object detection pulses are generated by low power object detection pulse injection circuitry separate from the inverter and coupled to the wireless power transfer coil.

4. The electronic device of claim 3 wherein the low power object detection pulse injection circuitry includes detection circuitry responsive to a change in one or more electrical or magnetic parameters of a circuit including the wireless power transfer coil.

5. The electronic device of claim 1 wherein the low power object detection pulses are supplied at a frequency of 10 Hz.

6. The electronic device of claim 1 wherein the low power object detection pulses have a magnitude of 1.2V.

7. The electronic device of claim 1 wherein the low power object detection pulses are initially supplied at a first interval and, upon initial detection of the object, further low power object detection pulses are supplied at a second interval shorter than the first interval.

8. The electronic device of claim 1 wherein the wireless power transfer coil is a single coil.

9. The electronic device of claim 1 wherein the rectifier and the inverter are comprised of the same switching devices.

10. The electronic device of claim 1 wherein at least one of activating the wireless power transmitter mode and activating the wireless power receiver mode comprising loading additional firmware corresponding to one of the respective modes.

11. The electronic device of claim 1 wherein activating the wireless power transmitter mode comprising sending one or more object detection pings with an interval between at least two of the one or more object detection pings being randomized.

12. A method, performed by wireless power transfer controller and communication circuitry of an electronic device operable in a wireless power receiver mode to receive power from a wireless power transmitter or in a wireless power transmitter mode to transmit power to an accessory, the method comprising:
- detecting an object in proximity to the electronic device by using a wireless power transfer coil to transmit a plurality of low power object detection pulses and detect a response to the low power object detection pulses associated with the object, wherein the low power object detection pulses are generated by the controller and communication circuitry without using a rectifier or an inverter of a wireless power transfer system associated with the electronic device;
- responsive to detecting the object, identifying the object as one of at least a wireless power receiver and a wireless power transmitter;
- responsive to identifying the object as a wireless power receiver, activating the wireless power transmitter mode and transmitting power to the accessory using wireless power transfer circuitry of the electronic device; and
- responsive to identifying the object as a wireless power transmitter, activating the wireless power receiver mode and receiving power from the wireless power transmitter using the wireless power transfer circuitry of the electronic device.

13. The method of claim 12 wherein the response to the low power object detection pulses associated with the object is a change in one or more electrical or magnetic parameters of a circuit including a wireless power transfer coil of the wireless power transfer circuitry.

14. The method of claim 12 wherein the low power object detection pulses are generated by low power object detection pulse injection circuitry separate from an inverter of the wireless power transfer circuitry and coupled to the wireless power transfer coil of the wireless power transfer circuitry.

15. The method of claim 14 wherein the low power object detection pulse injection circuitry includes detection circuitry responsive to a change in one or more electrical or magnetic parameters of a circuit including the wireless power transfer coil of the wireless power transfer circuitry.

16. The method of claim 12 wherein the low power object detection pulses are supplied at a frequency of 10 Hz.

17. The method of claim 12 wherein the low power object detection pulses have a magnitude of 1.2V.

18. The method of claim 12 wherein the low power object detection pulses are initially supplied at a first interval and, upon initial detection of the object, further low power object detection pulses are supplied at a second interval shorter than the first interval.

19. The method of claim 12 wherein at least one of activating the wireless power transmitter mode and activating the wireless power receiver mode comprising loading additional firmware corresponding to one of the respective modes.

20. The method of claim 12 wherein activating the wireless power transmitter mode comprises sending one or more object detection pings with an interval between at least two of the one or more object detection pings being randomized.

21. Controller and communication circuitry for a wireless power transfer system of an electronic device, wherein the electronic device is selectively operable in a wireless power receiver mode to receive power from a wireless power transmitter and in a wireless power transmitter mode to transmit power to an accessory, the controller and communication circuitry being configured to:
- detect an object in proximity to the electronic device by using a wireless power transfer coil to transmit a plurality of low power object detection pulses and detect a response to the low power object detection pulses associated with the object, wherein the low power object detection pulses are generated by the controller and communication circuitry without using a rectifier or an inverter of the wireless power transfer system of the electronic device;
- responsive to detecting the object, identify the object as one of at least a wireless power receiver and a wireless power transmitter;
- responsive to identifying the object as a wireless power receiver, activate the wireless power transmitter mode; and
- responsive to identifying the object as a wireless power transmitter, activate the wireless power receiver mode.

22. The controller and communication circuitry of claim 21 wherein the controller and communication circuitry is further configured to:
- activate the wireless power transmitter mode by loading additional firmware corresponding to the wireless power transmitter mode; and
- activate the wireless power receiver mode by loading additional firmware corresponding to the wireless power receiver mode.

* * * * *